(12) United States Patent
Han et al.

(10) Patent No.: US 11,864,251 B2
(45) Date of Patent: Jan. 2, 2024

(54) WIRELESS COMMUNICATION DEVICE AND METHOD OF CONNECTING WIRELESS COMMUNICATION

(71) Applicant: Samsung Electronics Co., Ltd., Suwon-si (KR)

(72) Inventors: Dongku Han, Suwon-si (KR); Srinivas Chinthalapudi, Bangalore (IN); Jaidong Kim, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 200 days.

(21) Appl. No.: 17/196,471

(22) Filed: Mar. 9, 2021

(65) Prior Publication Data

US 2022/0015165 A1 Jan. 13, 2022

(30) Foreign Application Priority Data

Jul. 7, 2020 (IN) .............................. 202021028839

(51) Int. Cl.
*H04W 76/00* (2018.01)
*H04W 76/14* (2018.01)
*H04W 8/18* (2009.01)
*H04L 65/1104* (2022.01)
*H04W 92/18* (2009.01)

(52) U.S. Cl.
CPC ......... *H04W 76/14* (2018.02); *H04L 65/1104* (2022.05); *H04W 8/183* (2013.01); *H04W 92/18* (2013.01)

(58) Field of Classification Search
None
See application file for complete search history.

(56) References Cited

U.S. PATENT DOCUMENTS

| | | |
|---|---|---|
| 9,185,533 B2 | 11/2015 | Chin et al. |
| 9,351,137 B2 | 5/2016 | Kasilya Sudarsan et al. |
| 9,432,505 B2 | 8/2016 | Shi et al. |
| 9,918,219 B2 | 3/2018 | Xu et al. |
| 10,356,571 B2 | 7/2019 | Pattan et al. |
| 2002/0085516 A1 | 7/2002 | Bridgelall |
| 2011/0280239 A1 | 11/2011 | Tung et al. |
| 2014/0273974 A1 | 9/2014 | Varghese et al. |
| 2014/0274006 A1 | 9/2014 | Mutya et al. |
| 2016/0014578 A1 | 1/2016 | Kadiyala et al. |

(Continued)

FOREIGN PATENT DOCUMENTS

| | | | | |
|---|---|---|---|---|
| CN | WO2021057263 A1 | * | 2/2021 | ............ H04W 4/16 |
| CN | 110856190 B | * | 5/2022 | ............ H04W 24/02 |

*Primary Examiner* — Abdelillah Elmejjarmi
(74) *Attorney, Agent, or Firm* — Harness, Dickey & Pierce, P.L.C.

(57) ABSTRACT

A method of performing wireless communication for a wireless communication device including a first Subscriber Identity Module (SIM) and a second SIM includes performing a first wireless communication with a first terminal device through the first SIM, receiving a request for connection of a second wireless communication from a second terminal device through the second SIM, determining a target SIM among the first SIM and the second SIM in response to the request, and performing the first wireless communication and the second wireless communication through the target SIM.

14 Claims, 14 Drawing Sheets

(56) References Cited

U.S. PATENT DOCUMENTS

2016/0014579 A1* 1/2016 Kasilya Sudarsan ........................ H04W 76/15 455/553.1
2018/0227383 A1 8/2018 Vasanthasenan et al.

* cited by examiner

WIRELESS COMMUNICATION DEVICE AND METHOD OF CONNECTING WIRELESS COMMUNICATION

CROSS-REFERENCE TO RELATED APPLICATIONS

This application claims priority under 35 U.S.C. § 119 to Indian Patent Application No. 202021028839 filed on Jul. 7, 2020, in the Indian Intellectual Property Office, the disclosure of which is incorporated by reference herein in its entirety.

BACKGROUND

The inventive concepts relate to a wireless communication device and a method of connecting wireless communication through a call, and more particularly, to a wireless communication device, which includes a plurality of subscriber identity modules (SIMs) and performs wireless communications with a plurality of terminal devices by using the SIMs, and a method of connecting wireless communication.

A multi Subscriber Identity Module (SIM) wireless communication device like a mobile phone, a personal digital assistant, a tablet PC, and a laptop computer may include two or more SIM cards.

In a conventional multi-SIM wireless communication device, when connection of wireless communication is performed with an external terminal device through a first SIM, the first SIM may occupy RF resources of the multi-SIM wireless communication device. Therefore, when a request for connection of new wireless communication through a second SIM is received while wireless communication is being performed through the first SIM, the multi-SIM wireless communication device ends the existing wireless communication or refuses connection of the new wireless communication.

Therefore, it is difficult for a conventional multi-SIM wireless communication device to perform a plurality of wireless communication connections with respect to a plurality of SIMs in parallel, thereby causing user inconvenience.

SUMMARY

The inventive concepts provide a wireless communication device and a wireless communication method for transferring at least some of wireless communications to maintain and perform the plurality of wireless communications through any one SIM when connections of the plurality of wireless communications are respectively established with respect to a plurality of SIMs.

According to an aspect of the inventive concepts, there is provided a method of performing wireless communication for a wireless communication device including a first Subscriber Identity Module (SIM) and a second SIM, the method including performing a first wireless communication with a first terminal device through the first SIM, receiving a request for connection of a second wireless communication from a second terminal device through the second SIM, determining a target SIM among the first SIM and the second SIM in response to the request, and performing the first wireless communication and the second wireless communication through the target SIM.

According to an aspect of the inventive concepts, there is provided a wireless communication device including a first Subscriber Identity Module (SIM), a second SIM, and processing circuitry configured to determine a target SIM among the first SIM and the second SIM to be used for a plurality of calls in response to receiving a request for a second call from a second terminal device through the second SIM while a first call is being performed with a first terminal device through the first SIM.

According to an aspect of the inventive concepts, there is provided a wireless communication system including a wireless communication device including a first Subscriber Identity Module (SIM) and a second SIM, a first terminal device, and a second terminal device, wherein the wireless communication device is configured to transmit a request for connection of a first wireless communication to the first terminal device through the second SIM in response to receiving a request for connection of a second wireless communication from the second terminal device through the second SIM while the first wireless communication is being performed with the first terminal device through the first SIM, resume the first wireless communication with the first terminal device through the second SIM based on an accept signal from the first terminal device, and perform the second wireless communication with the second terminal device through the second SIM contemporaneous with the first wireless communication with the first terminal device through the second SIM.

BRIEF DESCRIPTION OF THE DRAWINGS

An embodiment of the inventive concepts will be more clearly understood from the following detailed description taken in conjunction with the accompanying drawings in which.

DETAILED DESCRIPTION

Figure 1:
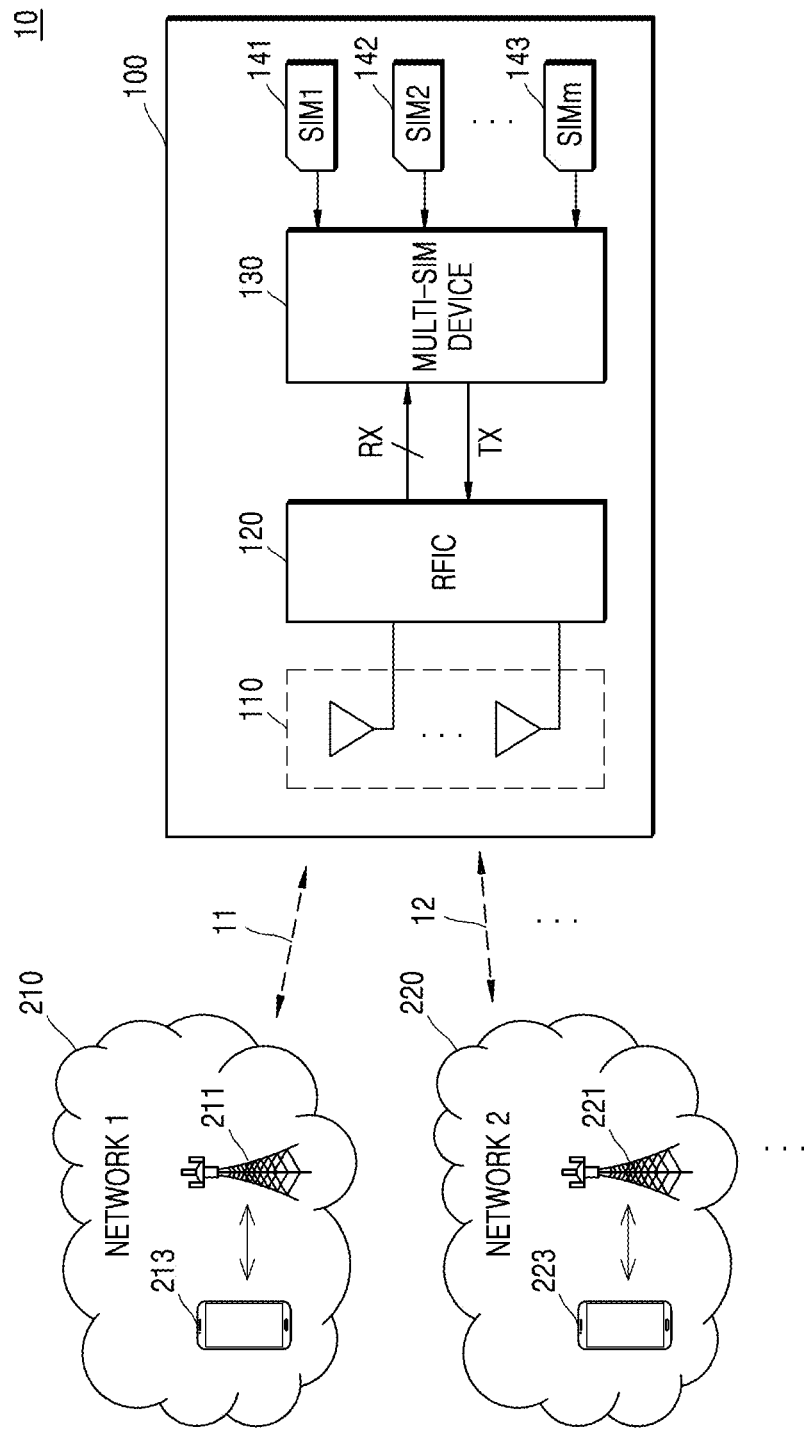
FIG. 1 is a block diagram showing a wireless communication system according to an embodiment of the inventive concepts.

FIG. 1 is a block diagram showing a wireless communication system according to an embodiment of the inventive concepts. Referring to FIG. 1, a wireless communication system 10 may include a wireless communication device 100 and a plurality of networks, for example, first and second networks 210 and 220.

The wireless communication device 100 may refer to an arbitrary device that is base stationary or mobile, and is capable of transmitting and receiving data, and/or control information, through wireless communications with the networks 210 and 220. For example, the wireless communication device 100 may be referred to as a terminal, terminal equipment, a terminal device, a mobile base station (MS), a mobile terminal (MT), a user terminal (UT), a subscriber base station (SS), a wireless device, a handheld device, etc.

The first and second networks 210 and 220 may each include a base station, for example, a first or second base station 211 or 221, and/or a first or second terminal device 213 or 223 connected to the first or second base station 211 or 221, respectively. The first or second base station 221 or 222 may refer to a fixed base station communicating with the wireless communication device 100, the first or second terminal device 213 or 223, and/or another base station. The first or second base station 221 or 222 may exchange data and/or control information by communicating with the wireless communication device 100, the first or second terminal device 213 or 223, and/or another base station. For example, the base station may be referred to as a node B, an evolved node B (eNB), a next generation node B (gNB), a sector, a site, a base transceiver system (BTS), an access point (AP), a relay node, a remote radio head (RRH), a radio unit (RU), a small cell, etc. In this specification, a base station may be understood as a comprehensive (non-limiting) term indicating a portion or a function covered by a base station controller (BSC) in a code division multiple access (CDMA) system, a Node-B in a wideband CDMA (WCDMA) system, an eNB in a long term evolution (LTE) system, a gNB in a 5th generation new radio (5G NR) system, a sector (site), a relay node, an RRH and/or an RU, and/or may include various coverage areas like a megacell, a macrocell, a microcell, a picocell, a femtocell and/or a small cell communication range.

The wireless communication device 100 may access the first network 210 through the first base station 211 and may access the second network 220 through the second base station 221. The wireless communication device 100 may communicate with the first network 210 and the second network 220 according to arbitrary radio access technology (RAT). For example, the wireless communication device 100 may communicate with the first network 210 and the second network 220 according to a 5th generation (5G) system, a 5G New Radio (NR) system, a long term evolution (LTE) system, a code division multiple access (CDMA) system, a global system for mobile communications (GSM) system, a wireless local area network (WLAN) system, and/or another arbitrary RAT, but the inventive concepts are not limited thereto. The wireless communication device 100 may communicate with the first network 210 and the second network 220 according to the same RAT, or similar RATs, in an embodiment and may also communicate with the first network 210 and the second network 220 according to different RATs in an embodiment.

As shown in FIG. 1, the wireless communication device 100 may include an antenna array 110, a radio frequency integrated circuit (RFIC) 120, a multi-SIM device 130, and/or m SIMs, for example, a first SIM 141, a second SIM 142, a third SIM 143, and so on (m is an integer greater than 1). The antenna array 110 may include at least one antenna and may receive RF signals from the first base station 211 and second base station 221, and/or transmit RF signals to the first base station 211 and second base station 221. In an embodiment, the antenna array 110 may include a plurality of antennas for use in performing multi-input multi-output (MIMO).

The RFIC 120 is hardware coupled with the antenna array 110 and the multi-SIM device 130, and may provide RF resources (e.g., an RF path) for wireless communication. For example, the RFIC 120 may be referred to as a transceiver, may provide a reception signal RX as a baseband signal to the multi-SIM device 130 by processing an RF signal received from the antenna array 110, and may provide an RF signal to the antenna array 110 by processing a transmission signal TX as a baseband signal. The RFIC 120 may be controlled by the multi-SIM device 130 and may include, as a non-limiting example, switches, matching circuits, filters, amplifiers, mixers, etc.

The multi-SIM device 130 may communicate with the RFIC 120 through baseband signals RX and TX, and may be coupled with the m SIMs, that is, the first SIM 141, the second SIM 142, the third SIM 143, and so on. For example, the first SIM 141 may include information for accessing the first network 210 through first wireless communication 11, and the second SIM 142 may include information for accessing the second network 220 through second wireless communication 12. As described below with reference to FIG. 2, the multi-SIM device 130 may have an architecture for processing a connection related to the first SIM 141 and a connection related to the second SIM 142. In an embodiment, the multi-SIM device 130 may include a hardware block designed through logical synthesis, a software block including a series of instructions, a processing unit including at least one processor for executing a series of instructions, and/or combinations thereof. In an embodiment, the multi-SIM device 130 may be referred to as a modem or a baseband processor.

The m SIMs, that is, the first SIM 141, the second SIM 142, the third SIM 143, and so on, may support multi-SIM (MS) wireless communication. For example, referring to FIG. 1, the first SIM 141 may perform the first wireless communication 11 associated with the first network 210 including the first base station 211 and the first terminal device 213, whereas the second SIM 142 may perform the second wireless communication 12 associated with the second network 220 including the second base station 221 and the second terminal device 223. The first wireless communication 11 and the second wireless communication 12 may be referred to as a first connection and a second connection, respectively, and/or may be referred to as a first subscription and a second subscription, respectively.

As in the above example, in the case of performing two wireless communications related to two SIMs, that is, the first and second SIMs 141 and 142, the wireless communication device 100 may be referred to as a dual-SIM device and may operate as a dual receive single transmit dual-SIM dual standby (DR-DSDS) device or a dual-SIM dual-active (DSDA) device.

When the wireless communication device 100 is a DR-DSDS device, the two SIMs, that is, the first SIM 141 and the second SIM 142, may share RF resources (e.g., an RF path) provided by the RFIC 120. Therefore, the two SIMs, that is, the first SIM 141 and the second SIM 142, may use the RFIC 120 in a mutually exclusive manner to perform communication, and thus, one of a connection to the first wireless communication 11 and/or a connection to the second wireless communication 12 may be suspended.

For example, the first SIM 141 may receive a request for a mobile termination (MT) call from the first terminal device 213 through the first base station 211 and perform a first call in response to the MT call request. At this time, the first SIM 141 may occupy the RFIC 120 to perform the first call, and the second wireless communication 12 through the second SIM 142 may be suspended. Moreover, the second SIM 142 may receive a request for a new second call from the second terminal device 223 through the second base station 221, and, when a user of the wireless communication device 100 accepts the request for the second call, the second SIM 142 may occupy the RFIC 120 instead of the first SIM 141. Therefore, the second call between the second SIM 142 and the second terminal device 223 is in a call active state, and the first call between the first SIM 141 and the first terminal device 213 may be changed to a call hold state.

Generally, when the first call is changed to the call hold state, it does not immediately or contemporaneously lead to a call drop where communication is ended. However, because the first SIM 141 is unable to occupy the RFIC 120 due to the second SIM 142, the first SIM 141 is unable to transmit and/or receive signals to and from the first base station 211. Also, the first base station 211 may drop the first call when there is no transmission and/or reception of signals to and/or from the first SIM 141 for a predetermined or alternatively, given period of time. Therefore, the wireless communication device 100 according to the previous scheme is only capable of temporarily maintaining the first wireless communication 11 through the first SIM 141 and the second wireless communication 12 through the second SIM 142, and is unable to continuously maintain the first wireless communication 11 and the second wireless communication 12. In other words, the wireless communication device 100 according to the previous scheme may receive a request for a second call from the second SIM 142 while performing the first call through the first SIM 141, but it is difficult to continuously maintain one of the first call and the second call in the call hold state.

Moreover, the wireless communication device 100 according to an embodiment of the inventive concepts may continuously perform the first wireless communication 11 and the second wireless communication 12 without a suspension even when the wireless communication device 100 is a DR-DSDS device. In detail, when a connection of the first wireless communication 11 to the first SIM 141 and a connection of the second wireless communication 12 to the second SIM 142 are established, the multi-SIM device 130 may control any one of the first SIM 141 and the second SIM 142 to perform the first wireless communication 11 and the second wireless communication 12 based on information about the first wireless communication 11 or the second wireless communication 12. Hereinafter, the operation of the wireless communication device 100 will be described in detail.

First, the multi-SIM device 130 may perform the first wireless communication 11 with the first terminal device 213 through the first SIM 141. Next, the multi-SIM device 130 may receive a request of connection of the second wireless communication 12 between the second SIM 142 and the second terminal device 223 from the second base station 221 while the first wireless communication 11 is being performed. Next, the user of the wireless communication device 100 may accept the second wireless communication 12 with respect to the request of connection of the second wireless communication 12 received by the multi-SIM device 130. In response to an accept signal, the multi-SIM device 130 may control the second SIM 142 to occupy the RFIC 120 and perform the second wireless communication 12 with the second terminal device 223. Therefore, the first wireless communication 11 between the first SIM 141 and the first terminal device 213 may be switched to a call hold state, and the second wireless communication 12 between the second SIM 142 and the second terminal device 223 may be switched to a call active state.

Next, the multi-SIM device 130 may determine a target SIM used for the first wireless communication 11 and/or the second wireless communication 12 among the first SIM 141 and the second SIM 142. A determined target SIM may occupy the RFIC 120. Next, the multi-SIM device 130 may identify a target terminal device for which the target SIM is not currently performing communication among the first terminal device 213 and the second terminal device 223. Next, the multi-SIM device 130 may control the target SIM to transmit a wireless communication request to the target terminal device. Next, when an accept signal is received from the target terminal device, the multi-SIM device 130 may perform connection of wireless communication with the target terminal device through the target SIM. In addition, the multi-SIM device 130 may control the remaining SIM of the first SIM 141 and the second SIM 142 other than the target SIM to end wireless communication that was being performed through the remaining SIM.

For example, when the target SIM is the first SIM 141, the multi-SIM device 130 may control the first SIM 141 to transmit a request for connection of wireless communication to the second terminal device 223 that is not currently communicating with the first SIM 141. Next, when an accept signal is received from the second terminal device 223, the multi-SIM device 130 may perform connection of new second wireless communication 12 with the second terminal device 223 through the first SIM 141. Next, the multi-SIM device 130 may end existing second wireless communication 12 between the second SIM 142 and the second terminal device 223. Therefore, the multi-SIM device 130 may perform existing connection of first wireless communication 11 with the first terminal device 213 and new connection of the second wireless communication 12 with the second terminal device 223 through the first SIM 141.

On the other hand, when a refuse signal is received from the second terminal device 223, the multi-SIM device 130 may determine that the second terminal device 223 does not want to communicate with the wireless communication device 100, and thus, the multi-SIM device 130 may end wireless communication connection with the second terminal device 223. In other words, the multi-SIM device 130 may end the existing second wireless communication 12 with the second terminal device 223 through the second SIM 142 and may not perform new second wireless communication 12 with the second terminal device 223 through the first SIM 141.

In another example, when the target SIM is the second SIM 142, the multi-SIM device 130 may control the second SIM 142 to transmit a request for connection of wireless communication to the first terminal device 213 that is not currently communicating with the second SIM 142. Next, when an accept signal is received from the first terminal device 213, the multi-SIM device 130 may perform connection of new first wireless communication 11 with the first terminal device 213 through the second SIM 142. Next, the multi-SIM device 130 may end existing first wireless communication 11 between the first SIM 141 and the first terminal device 213. Therefore, the multi-SIM device 130 may perform the new existing first wireless communication 11 with the first terminal device 213 and existing second wireless communication 12 with the second terminal device 223 through the second SIM 142.

Moreover, when a refuse signal is received from the first terminal device 213, the multi-SIM device 130 may end wireless communication with the first terminal device 213. In other words, the multi-SIM device 130 may end the existing first wireless communication 11 with the first terminal device 213 through the first SIM 141 and may not perform new first wireless communication 11 with the first terminal device 213 through the second SIM 142.

Moreover, even when the target SIM occupies the RFIC 120, not both the first wireless communication 11 and the second wireless communication 12 have the active state, and at least one wireless communication may be in the hold state. For example, a request for a connection of the second wireless communication 12 may be received while the first wireless communication 11 is being performed, and a user may accept the request for connection of the second wireless communication 12. In this case, because the user prioritizes the second wireless communication 12 over the first wireless communication 11, the second wireless communication 12 may be in the active state and the first wireless communication 11 may be in the hold state.

At this time, unlike the previous method described above, wireless communication performed through the target SIM may be maintained without being ended even when the wireless communication is in the hold state. In detail, because the target SIM of the wireless communication device 100 is occupying the RFIC 120, signals may be periodically or aperiodically transmitted and received to and from a base station related to the wireless communication in the hold state. Therefore, the wireless communication performed through the target SIM may be maintained without being ended even when it is in the hold state.

As described above, when a plurality of wireless communications respectively related to a plurality of SIMs are established, the wireless communication device 100 according to an embodiment of the inventive concepts may newly establish at least one of the wireless communications through a target SIM, thereby maintaining the wireless communications and improving user convenience. Moreover, hereinafter, for convenience of explanation, a series of operations for newly establishing connection of at least one wireless communication through a target SIM and ending wireless communications of remaining SIMs other than the target SIM will be referred to as a connection transfer operation.

Moreover, it has been described above that the wireless communication device 100 according to an embodiment of the inventive concepts is a DR-DSDS device, but the inventive concepts may be applied in the same regard when the wireless communication device 100 is a DSDA device. In other words, the inventive concepts may be applied in the same regard even when the RFIC 120 of the wireless communication device 100 provides mutually independent RF resources for two SIMS, that is, the first SIM 141 and the second SIM 142, and the first SIM 141 and second SIM 142, of the wireless communication device 100 are capable of performing reception independently from each other.

Also, an embodiment of the inventive concepts will be described with reference mainly to a wireless communication using the two SIMs, that is, the first SIM 141 and the second SIM 142, (e.g., dual-SIM wireless communication), but an embodiment of the inventive concepts may be applied in the same regard to multi-SIM wireless communication using three or more SIMs.

Also, although FIG. 1 shows that the wireless communication device 100 includes the antenna array 110, the RFIC 120, the multi-SIM device 130, and the m SIMs, that is, the first SIM 141, the second SIM 142, and the third SIM 143, and descriptions thereof have been given above, the wireless communication device 100 may also include an input device (not shown) for receiving a user input, a display (not shown) that displays information to a user, etc.

Figure 2:
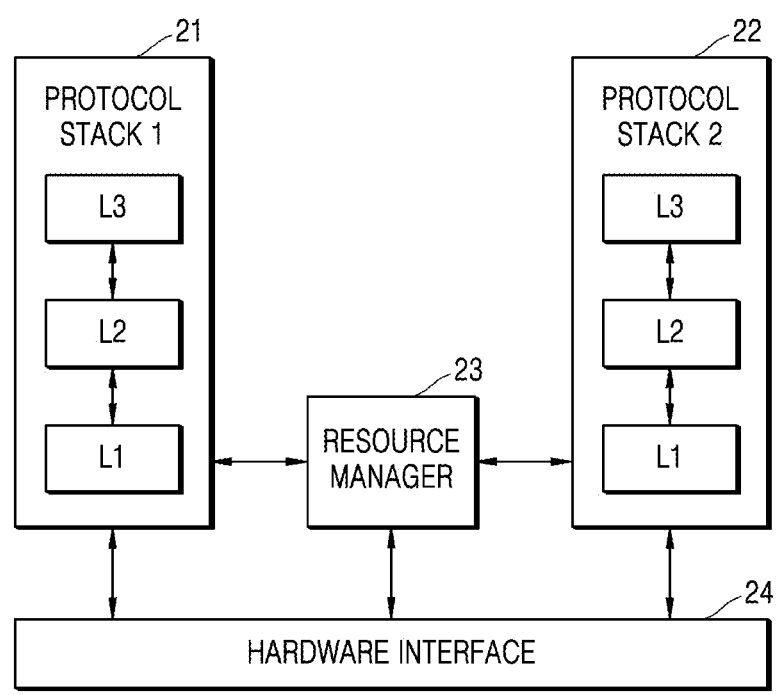
FIG. 2 is a block diagram showing a protocol stack system according to an embodiment of the inventive concepts.

FIG. 2 is a block diagram showing a protocol stack system according to an embodiment of the inventive concepts. In detail, FIG. 2 shows a control plane of a first protocol stack 21 and a second protocol stack 22 included in a protocol stack system 20. In an embodiment, the protocol stack system 20 of FIG. 2 may be implemented in the multi-SIM device 130 of FIG. 1, and the multi-SIM device 130 may perform operations for wireless communication through the protocol stack system 20. At least some of blocks shown in FIG. 2 may be implemented in hardware logic in an embodiment or in software modules executed by at least one processor in an embodiment.

Referring to FIGS. 1 and 2, the protocol stack system 20 may include the first protocol stack 21 and the second protocol stack 22 associated with the first SIM 141 and the second SIM 142, respectively. Each of the first protocol stack 21 and the second protocol stack 22 may support an arbitrary RAT. In an embodiment, the first protocol stack 21 and the second protocol stack 22 may interact with a shared upper layer, e.g., an application layer, and the upper layer may provide interfaces with programs for obtaining information about the first wireless communication 11 and the second wireless communication 12, or providing commands related thereto. The upper layer may be implemented in the multi-SIM device 130 or may be implemented in another device separate from the multi-SIM device 130.

The protocol stack system 20 may include a hardware interface 24 shared by the first protocol stack 21 and the second protocol stack 22. The hardware interface 24 may provide an interface to hardware, e.g., the RFIC 120 of FIG. 1, and the first protocol stack 21 and the second protocol stack 22 may provide signals to the RFIC 120, or receive signals from the RFIC 120, through the hardware interface 24. In an embodiment, the hardware interface 24 may be referred to as a driver of the RFIC 120.

The first protocol stack 21 and the second protocol stack 22 for a control plane may each include a plurality of layers. As shown in FIG. 2, the first protocol stack 21 may include a first layer L1, a second layer L2 and a third layer L3, and the first layer L1, the second layer L2, and third layer L3 may correspond to the lower three layers of the open system interconnection (OSI) model. For example, in LTE or 5G NR, the physical (PHY) layer may be included in the first layer L1, the medium access control (MAC) layer, the radio link control (RLC) layer, and the packet data convergence protocol (PDCP) layer may be included in the second layer L2, and the radio resource control (RRC) layer and the non-access stratum (NAS) layer may be included in the third layer L3. The second protocol stack 22 may also include a first layer L1, a second layer L2, and a third layer L3, similar to the first protocol stack 21. In the present specification, an operation performed by the first protocol stack 21 may be referred to as an operation performed by the first SIM 141, and an operation performed by the second protocol stack 22 may be referred to as an operation performed by the second SIM 142.

According to an embodiment of the inventive concepts, the first protocol stack 21 and the second protocol stack 22 may share information about wireless communication with each other. For example, the first protocol stack 21 may perform the first wireless communication 11 with the first terminal device 213, and the second protocol stack 22 may perform the second wireless communication 12 with the second terminal device 223. Also, the multi-SIM device 130 may determine the first SIM 141 as a target SIM to perform a plurality of wireless communications. Also, the first protocol stack 21 may request information about the second wireless communication 12 from the second protocol stack 22. The second protocol stack 22 may share information about the second wireless communication with the first protocol stack 21 in response to the request.

Here, information about wireless communication may include information about a terminal device accessing the wireless communication and/or information about a SIM accessing the wireless communication. Information about a terminal device accessing wireless communication may include at least one of a device identifier (ID), an IP address, and/or a serial code. Moreover, information about a terminal device is not limited to the above-stated examples and may include various other information.

Also, information about a SIM accessing wireless communication (which may be referred to as SIM information or user information; hereinafter referred to as SIM information for convenience of explanation) may include at least one of a Call Composer ID and a Session Initiation Protocol (SIP) Call ID of a call that has previously been, or is currently being, performed by a corresponding SIM. The first protocol stack 21 may transmit a request for connection of new wireless communication by using received SIM information. In detail, the first protocol stack 21 may include received SIM information in information used for a connection in an Enriched Calling function supported by the Rich Communication Services (RCS) Universal Profile 2.0, or a higher version thereof, and transmit a request for connection of wireless communication. Here, the Enriched Calling function may refer to a function of sharing user information content before, during, and/or after a voice call. Also, items defined in the Enriched Calling function may include, for example, Important Call Indicator, Subject, Image, Location, and the items may be set for each SIM requesting for connection of wireless communication. Definitions of the above-stated items are as follows.

TABLE 1

| Important Call Indicator | an indicator that identifies to the B-Party that the voice or video call is of high importance |
| Subject | a message defined by the A-Party, either entered as free text (limited to 1 to 60 characters), or selected from a list of pre-defined, or |

TABLE 1-continued

| Image | alternatively given subjects. (including Emoji's) an existing image selected from the device gallery, or a new picture taken with the device camera. |
| Location | the current Location of the A-Party |
| Call Composer ID | ID of a view on the device that allows the A-Party to enrich outgoing voice calls with pre-call content before placing the call |
| SIP Call ID | ID of a SIP (Session Initiation Protocol) call |

(*A-party: The party that initiates a communication event e.g., creates and sends a chat message or File Transfer, or initiates a call to the B-Party.
*B-party: The party that receives or is intended to receive a communication event e.g., a Chat Message, File Transfer or call from the A-Party).

Moreover, SIM information and information used for connection in the Enhanced Calling function are not limited to the above-stated examples and may include various other information.

Also, the first protocol stack 21 may transmit a request for connection of a new second wireless communication to the second terminal device 223 based on information about the second terminal device 223. The request for connection of new second wireless communication may include information about the second SIM 142. Also, the information about the second SIM 142 included in the request for connection of new second wireless communication may be used by the second terminal device 223 to determine whether the first SIM 141 and the second SIM 142 are both included in the wireless communication device 100.

In detail, when the request for connection of new second wireless communication, the second terminal device 223 may determine whether user information of a peer SIM already communicating with the second terminal device 223 is identical or similar to user information of the second SIM 142 by using information about the second SIM 142 included in the received request. When user information of both SIMs are identical or similar, the second terminal device 223 may determine that a request for wireless communication is received from another SIM (e.g., the first SIM 141) of the wireless communication device 100 including a SIM (that is, the second SIM 142) already communicating with the second terminal device 223. In other words, although the first SIM 141 and the second SIM 142 are SIMs that are different from each other, because both the first SIM 141 and the second SIM 142 are included in the same wireless communication device 100, or similar wireless devices, and are used by the same user, or similar users, the second terminal device 223 may accept a request for the second wireless communication 12 of the first SIM 141.

Also, when the first protocol stack 21 receives an accept signal from the second terminal device 223, the first protocol stack 21 may perform new second wireless communication 12 with the second terminal device 223. Moreover, although it has been described above that the second protocol stack 22 provides information about wireless communication to the first protocol stack 21, the first protocol stack 21 may also provide information about wireless communication to the second protocol stack 22. Also, although the above-described example has been illustrated and described that the first protocol stack 21 and the second protocol stack 22 share information through a request for information about wireless communication and a response thereto, in an embodiment, information may be shared by storing information about wireless communication in a memory that may be commonly accessed by the first protocol stack 21 and the second protocol stack 22.

A resource manager 23 may manage resources of the RFIC 120 to be provided to wireless communication by the first protocol stack 21 and wireless communication by the second protocol stack 22. For example, when the wireless communication device 100 is a DR-DSDS device and wireless communication through the first SIM 141 is established, the resource manager 23 may allocate resources of the RFIC 120 to wireless communication by the first protocol stack 21. The resource manager 23 may be stored in a memory as a software module executed by at least one processor in an embodiment, or may be a hardware module designed through a logical synthesis in an embodiment.

Figure 3:
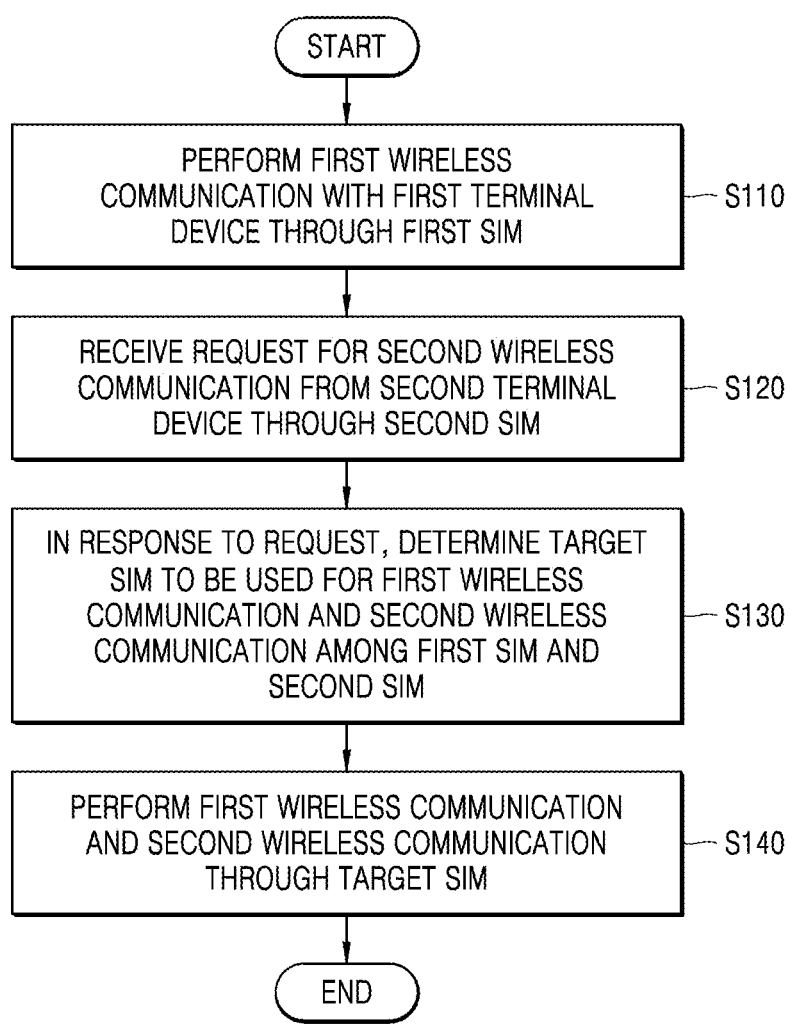
FIG. 3 is a flowchart of a wireless communication method according to an embodiment of the inventive concepts.

FIG. 3 is a flowchart of a wireless communication method according to an embodiment of the inventive concepts. In detail, FIG. 3 is a flowchart showing an example of a wireless communication method of the wireless communication device 100 of FIG. 1. The wireless communication method may be at least partially performed by the multi-SIM device 130 of FIG. 1.

Referring to FIGS. 1 and 3, the wireless communication device 100 may perform the first wireless communication 11 with the first terminal device 213 through the first SIM 141 (operation S110). In detail, when the wireless communication device 100 receives a request for connection of the first wireless communication 11 (e.g., a request for a first call) from the first terminal device 213 through the first SIM 141, the wireless communication device 100 may perform the first wireless communication 11 with the first terminal device 213 through the first SIM 141 in response to the received request. Alternatively, the wireless communication device 100 may transmit a request for the first wireless communication 11 to the first terminal device 213 through the first SIM 141 and, in response to an accept signal of the first terminal device 213, may perform the first wireless communication 11 with the first terminal device 213 through the first SIM 141.

Next, the wireless communication device 100 may receive a request for connection of the second wireless communication 12 (e.g., a request for a second call) from the second terminal device 223 through the second SIM 142 (operation S120). Next, the wireless communication device 100 may determine a target SIM used for the first wireless communication 11 and the second wireless communication 12 among the first SIM 141 and the second SIM 142 in response to the request (operation S130).

In detail, in response to the request, the wireless communication device 100 may notify a user of the wireless communication device 100 that the request for connection of the second wireless communication 12 has been received from the second terminal device 223. When the user accepts the second wireless communication 12, the wireless communication device 100 may determine a target SIM to maintain connections of two wireless communications as described in the inventive concepts. On the other hand, when the user refuses the second wireless communication 12, an operation for determining a target SIM may be omitted, and only the first wireless communication 11 may be performed. Moreover, an operation in which the wireless communication device 100 determines a target SIM will be described below in detail with reference to FIG. 4.

Next, the wireless communication device 100 may perform the first wireless communication 11 and the second wireless communication 12 through the target SIM (operation S140). In detail, the wireless communication device 100 may obtain information used to confirm that the first SIM 141 and the second SIM 142 are included in the same peer wireless communication device, or similar peer wireless communication devices. For example, the wireless communication device 100 may obtain a Call Composer ID and/or a SIP Call ID of a previous or existing connection of a remaining SIM other than the target SIM among the first SIM 141 and the second SIM 142. Next, the wireless communication device 100 may include the obtained information in information about pre-call services from among an Enriched Calling functions set with respect to the target SIM, e.g., Important Call Indicator, Subject, Image, or Location information.

Next, the wireless communication device 100 may identify a target terminal device for which the target SIM is not currently performing communication among the first terminal device 213 and the second terminal device 223. Next, the wireless communication device 100 may transmit a request for connection of wireless communication (e.g., a request for a third call) to a target terminal device through the target SIM along with the obtained information. For example, the wireless communication device 100 may transmit a request for connection of wireless communication by transmitting information about pre-call services of the target SIM including the obtained information regarding the remaining SIM to the target terminal device.

When an accept signal is received from the target terminal device, the wireless communication device 100 may perform a wireless communication with the target terminal device through the target SIM. On the other hand, when a refuse signal is received from the target terminal device, the wireless communication device 100 may determine that target terminal device does not want to communicate with the wireless communication device 100, and thus the wireless communication device 100 may end wireless communication (e.g., the first call or the second call) with the target terminal device.

Figure 4:
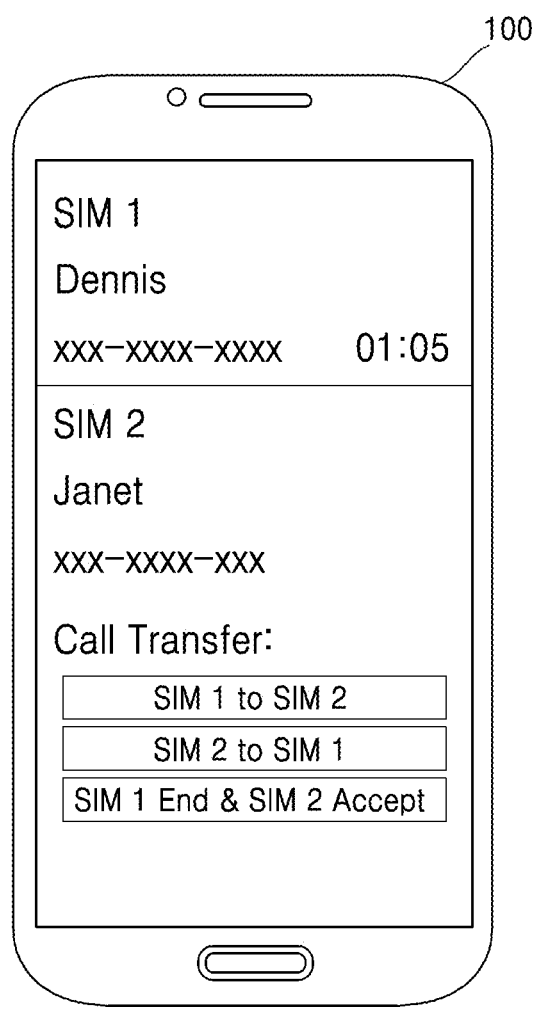
FIG. 4 is a diagram for describing a method by which a wireless communication device determines a target SIM according to an embodiment of the inventive concepts.

FIG. 4 is a diagram for describing a method by which a wireless communication device determines a target SIM according to an embodiment of the inventive concepts. In detail, FIG. 4 is a diagram for describing an example of a detailed operation of operation S130 of FIG. 3. In an embodiment, the wireless communication device 100 may receive a selection of a target SIM from a user.

Referring to FIGS. 1, 3 and 4, the wireless communication device 100 may receive a request for a second call from Janet through the second SIM 142 (SIM 2) while a first call with a first terminal device (e.g. Dennis) is being performed through the first SIM 141 (SIM 1). Next, the wireless communication device 100 may receive an accept signal for the second call from a second terminal device (e.g. Janet). In this case, the wireless communication device 100 may display a user interface (UI) requesting a selection by the user of a target SIM to be used for a plurality of wireless communications through a display to maintain both communications with Dennis and Janet.

In detail, the wireless communication device 100 may display a first option (SIM1 to SIM2) for transferring a wireless communication of the first SIM 141 to the second SIM 142, a second option (SIM2 to SIM1) for transferring a wireless communication of the second SIM 142 to the first SIM 141, and/or a third option (SIM 1 End & SIM 2 Accept) for ending the wireless communication of the first SIM 141 and performing only the wireless communication of the second SIM 142, and receive a selection of one option from the user.

Next, the wireless communication device 100 may determine a target SIM according to a selected option. For example, when the first option (SIM 1 to SIM 2) is selected, the wireless communication device 100 may determine the second SIM 142 as the target SIM. Next, the wireless communication device 100 may transmit a request for a third call to the first terminal device through the target SIM. For example, the wireless communication device 100 may transmit the request for the third call to Dennis through the second SIM 142 by using information about the first call between the first SIM 141 and Dennis. Next, the wireless communication device 100 may perform the third call with Dennis through the second SIM 142 and end the first call between the first SIM 141 and Dennis as Dennis accepts the request for the third call.

Also, when the second option (SIM 2 to SIM 1) is selected, the wireless communication device 100 may determine the first SIM 141 as the target SIM. Next, the wireless communication device 100 may transmit a request for a third call to the second terminal device through the target SIM. For example, the wireless communication device 100 may transmit the request for the third call to Janet through the first SIM 141 by using information about the second call between the second SIM 142 and Janet. Next, the wireless communication device 100 may perform the third call with Janet through the first SIM 141 and end the second call between the second SIM 142 and Janet as Janet accepts the request for the third call.

Also, when the third option (SIM 1 End & SIM 2 Accept) is selected, the wireless communication device 100 determines that the user does not want to perform a plurality of wireless communications through a single SIM, and may end the wireless communication of the first SIM 141 (e.g., the first call with Dennis) without determining the target SIM.

Moreover, the method by which the wireless communication device 100 determines a target SIM is not limited to the above-stated example. For example, the wireless communication device 100 may check a SIM pre-set or alternatively, given to be used for a plurality of wireless communications and may determine the checked SIM as (e.g., to be) the target SIM.

Figure 5:
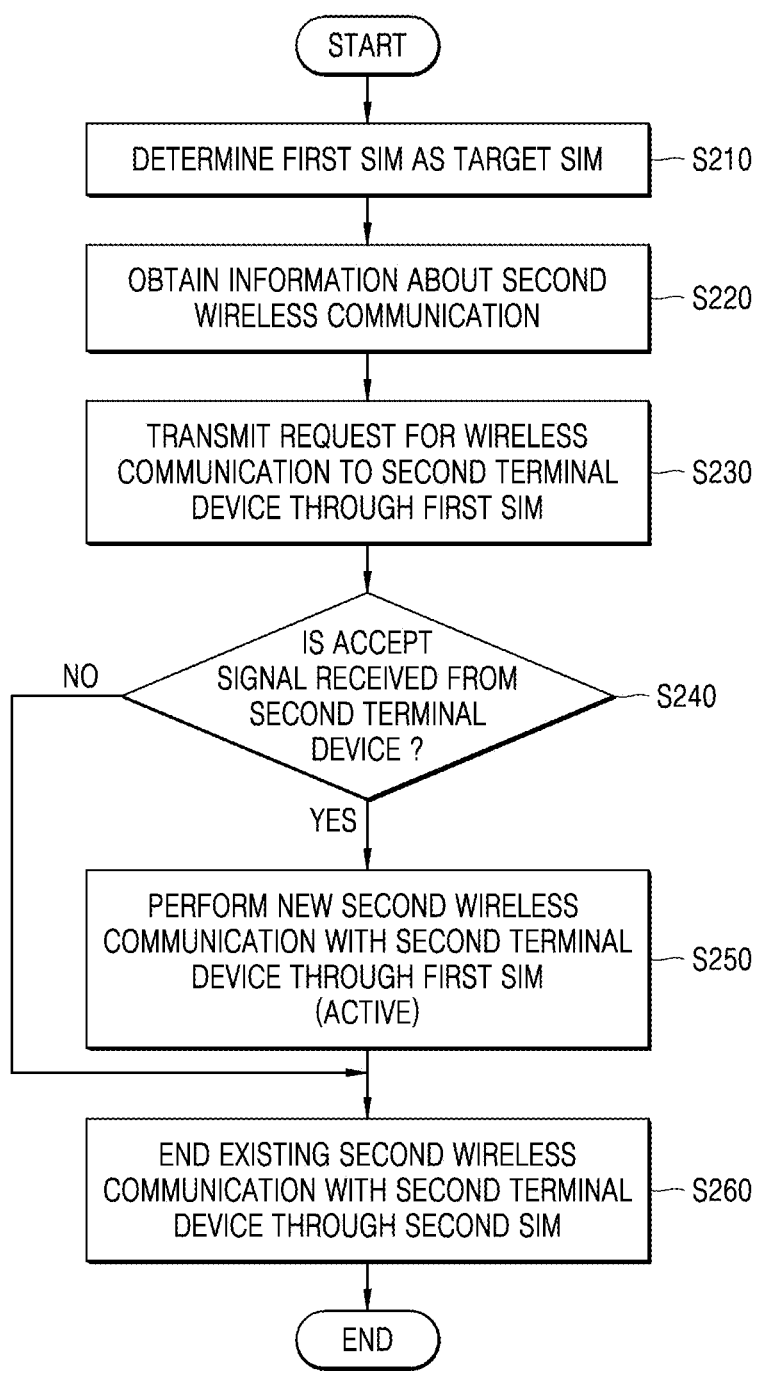
FIG. 5 is a flowchart of a method of performing a plurality of wireless communications of a target SIM according to an embodiment of the inventive concepts.

FIG. 5 is a flowchart of a method of performing a plurality of wireless communications of a target SIM according to an embodiment of the inventive concepts. In detail, FIG. 5 is a flowchart showing a detailed example of operation S130 and operation S140 of FIG. 3. Hereinafter, an embodiment in which the first SIM 141 is determined as a target SIM will be described.

Referring to FIGS. 1, 3, and 5, the wireless communication device 100 may first determine the first SIM 141 as the target SIM (operation S210). For example, referring to FIG. 4, the wireless communication device 100 may determine the first SIM 141 as the target SIM as a user selects the second option (SIM 2 to SIM 1). Next, the wireless communication device 100 may obtain information about the second wireless communication 12 (operation S220). In detail, the first protocol stack 21 of the wireless communication device 100 may obtain information about the connection of the second wireless communication 12 from the second protocol stack 22. The information about the connection of the second wireless communication 12 may include information about the second terminal device 223 and/or information about the second SIM 142.

Next, the wireless communication device 100 may transmit a request for connection of wireless communication to the second terminal device 223 through the first SIM 141 (operation S230). In detail, the wireless communication device 100 may transmit a request for connection of wireless communication to the second terminal device 223 through the target SIM (i.e. the first SIM 141) along with information about the second SIM 142.

Next, the wireless communication device 100 may determine whether an accept signal of the second terminal device 223 is received (operation S240). When no accept signal is received from the second terminal device 223 (operation S240—N), the wireless communication device 100 may determine that the second terminal device 223 does not want to communicate with the wireless communication device 100. Therefore, the wireless communication device 100 may not perform a wireless communication with the second terminal device 223 through the first SIM 141 and also end a previously established second wireless communication 12 with the second terminal device 223 through the second SIM 142 (operation S260).

On the other hand, when an accept signal is received from the second terminal device 223 (operation S240—Y), the wireless communication device 100 may perform connection of new second wireless communication 12 with the second terminal device 223 through the first SIM 141 (operation S250). In other words, the wireless communication device 100 may perform a previously established first wireless communication 11 and a newly established second wireless communication 12 through the first SIM 141. Moreover, because the user of the wireless communication device 100 has approved connection of the second wireless communication 12 requested while the first wireless communication 11 was being performed in the previous operation, the second wireless communication 12 may be in the active state, and the first wireless communication 11 may be in the hold state.

Next, the wireless communication device 100 may end a previously established second wireless communication 12 with the second terminal device 223 through the second SIM 142 to prevent or reduce duplication of communication (operation S260).

Figure 6:
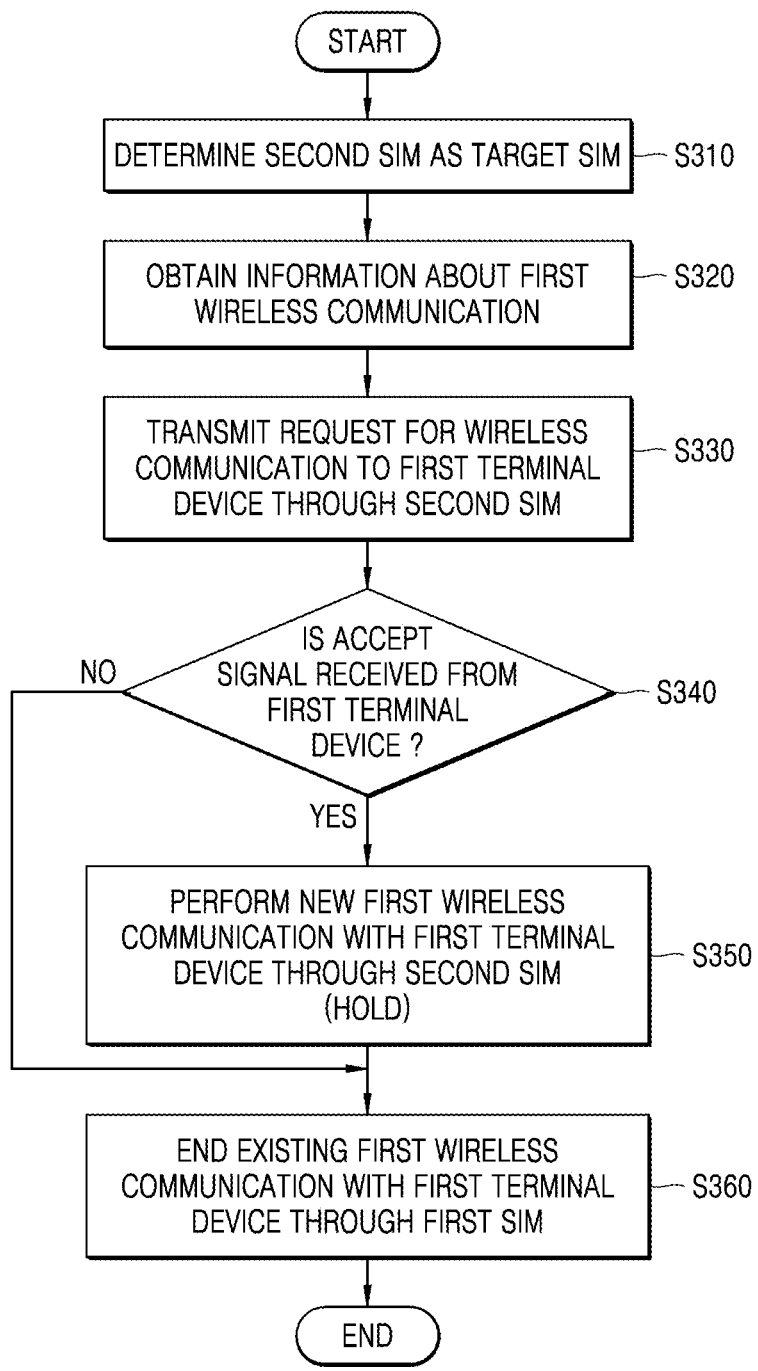
FIG. 6 is a flowchart of a method of performing a plurality of wireless communications of a target SIM according to an embodiment of the inventive concepts.

FIG. 6 is a flowchart of a method of performing a plurality of wireless communications of a target SIM according to an embodiment of the inventive concepts. In detail, FIG. 6 is a flowchart showing a detailed example of operation S130 and operation S140 of FIG. 3. Hereinafter, an embodiment in which the second SIM 142 is determined as a target SIM will be described.

Referring to FIGS. 1, 3, 4, and 6, the wireless communication device 100 may first determine the second SIM 142 as the target SIM (operation S310). For example, referring to FIG. 4, the wireless communication device 100 may determine the second SIM 142 as the target SIM as a user selects the first option (SIM 1 to SIM 2). Next, the wireless communication device 100 may obtain information about the first wireless communication 11 (operation S320). In detail, the second protocol stack 22 of the wireless communication device 100 may obtain information about connection of the first wireless communication 11 from the first protocol stack 21. The information about connection of the first wireless communication 11 may include information about the first terminal device 213 and/or information about the first SIM 141.

Next, the wireless communication device 100 may transmit a request for connection of wireless communication to the first terminal device 213 through the second SIM 142 (operation S330). In detail, the wireless communication device 100 may transmit a request for connection of wireless communication to the first terminal device 213 through the second SIM 142 along with information about the first SIM 141.

Next, the wireless communication device 100 may determine whether an accept signal of the first terminal device 213 is received (operation S340). When no accept signal is received from the first terminal device 213 (operation S340—N), the wireless communication device 100 may determine that the first terminal device 213 does not want to communicate with the wireless communication device 100. Therefore, the wireless communication device 100 may not perform a wireless communication with the first terminal device 213 through the second SIM 142 and also end a previously established first wireless communication 11 with the first terminal device 213 through the first SIM 141 (operation S360).

On the other hand, when an accept signal is received from the first terminal device 213 (operation S340—Y), the wireless communication device 100 may perform connection of new first wireless communication 11 with the first terminal device 213 through the second SIM 142 (operation S350). In other words, the wireless communication device 100 may perform a newly established first wireless communication 11 and a previously established second wireless communication 12 through the target SIM (i.e. the second SIM 142). Moreover, because the user of the wireless communication device 100 has approved connection of the second wireless communication 12 requested while the first wireless communication 11 was being performed in the previous operation, the second wireless communication 12 may have the active state, and the first wireless communication 11 may be in the hold state.

Next, the wireless communication device 100 may end a previously established first wireless communication 11 with the first terminal device 213 through the first SIM 141 to prevent or reduce duplication of communication (operation S360).

Figure 7:
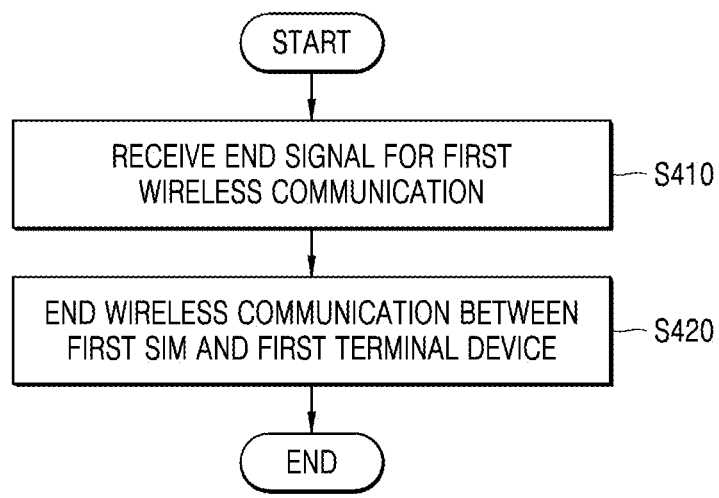
FIG. 7 is a flowchart of a method of terminating wireless communication of a wireless communication device according to an embodiment of the inventive concepts.

FIG. 7 is a flowchart of a method by which a wireless communication device ends a wireless communication according to an embodiment of the inventive concepts. In detail, FIG. 7 is a flowchart showing an example of detailed operations of operation S130 and operation S140 of FIG. 3. Hereinafter, an embodiment in which neither the first SIM 141 nor the second SIM 142 is determined as a target SIM will be described.

Referring to FIGS. 1, 3 and 7, the wireless communication device 100 may receive an end signal of the first wireless communication 11 (operation S410). For example, referring to FIG. 4, the wireless communication device 100 may not determine a target SIM as a user selects the third option (SIM 1 End & SIM 2 Accept).

Next, the wireless communication device 100 may end the first wireless communication 11 with the first terminal device 213 through the first SIM 141 (operation S420). Next, the wireless communication device 100 may perform only the second wireless communication 12 with the second terminal device 223 through the second SIM 142.

Figure 8:
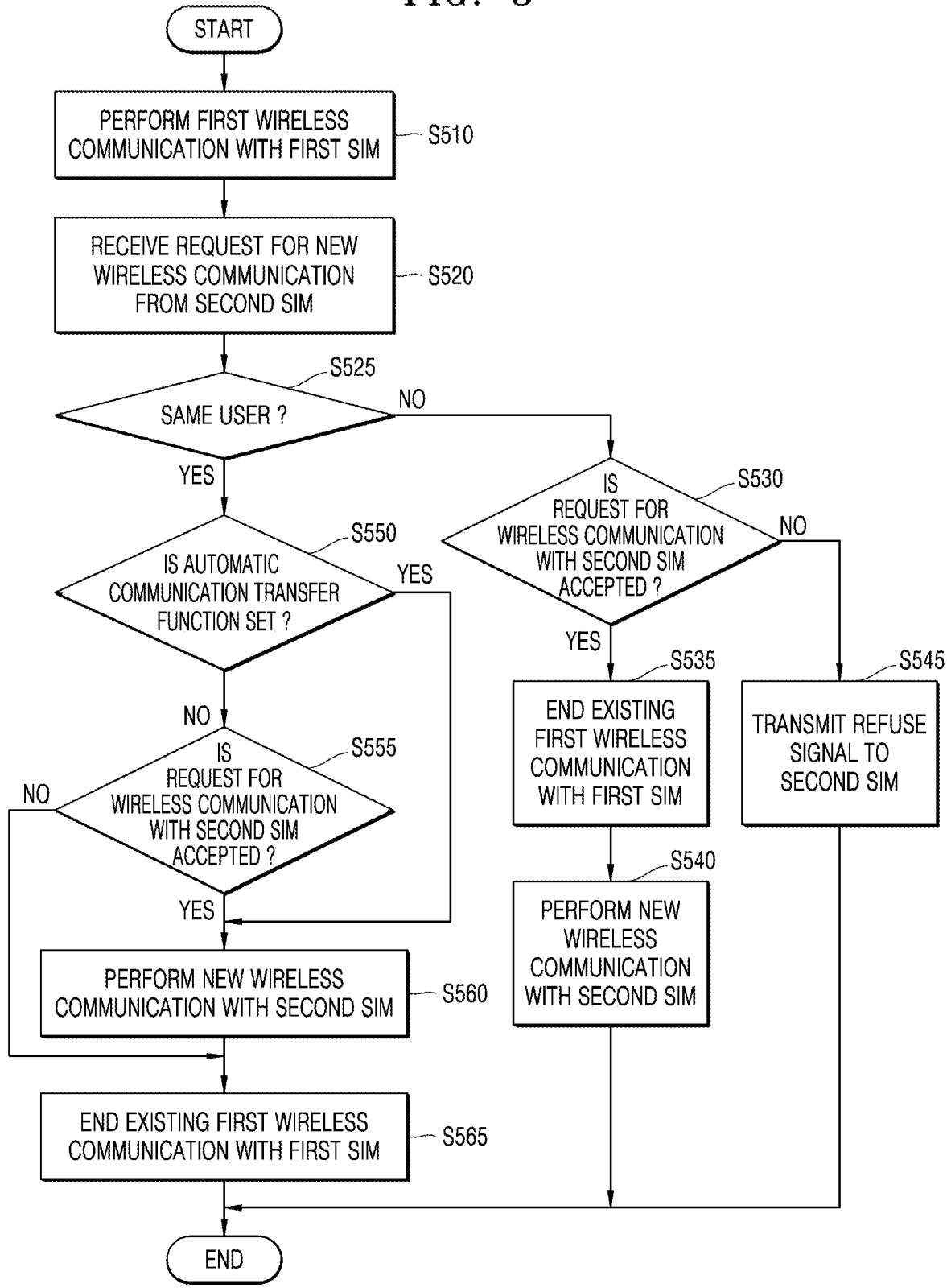
FIG. 8 is a flowchart of a method of transferring wireless communication of a terminal device according to an embodiment of the inventive concepts.

FIG. 8 is a flowchart of a method of transferring a wireless communication of a terminal device according to an embodiment of the inventive concepts. In detail, FIG. 8 is a flowchart for describing a method of transferring a wireless communication from the viewpoint of a terminal device performing a communication with any one SIM of the wireless communication device 100. In the present example, it is assumed that the terminal device is a device that supports Enhanced Calling functions. Also, for convenience of explanation, descriptions will be given below based on the operation of the first terminal device 213 of FIG. 1, but the second terminal device 223 of FIG. 1 may operate in substantially the same manner.

Referring to FIGS. 1 and 8, the first terminal device 213 may perform the first wireless communication 11 with the first SIM 141 of the wireless communication device 100 (operation S510). Next, the first terminal device 213 may receive a request for new wireless communication from the second SIM 142 of the wireless communication device 100 while the first wireless communication 11 is being performed (operation S520). In detail, the first terminal device 213 may receive a request for a new wireless communication including information about the first SIM 141 performing an existing wireless communication from the second SIM 142. The information about the first SIM 141 (e.g., a Call Composer ID and/or a SIP Call ID) may be received by being included in information used in the Pre-call Services from among the Enriched Calling functions.

Next, the first terminal device 213 may determine whether the first SIM 141 and the second SIM 142 correspond to the same user (operation S525) or similar users. In an embodiment, because the first terminal device 213 supports Enriched Calling functions, it may be determined whether the first SIM 141 and the second SIM 142 are both included in the wireless communication device 100 based on the information about the first SIM 141. In detail, the first terminal device 213 may compare information about a SIM currently communicating with the first terminal device 213 (e.g., the first SIM 141) with information about the first SIM 141 included in a request for wireless communication newly received from the second SIM 142, thereby determining whether the SIM currently communicating with the first terminal device 213 (e.g., the first SIM 141) is identical or similar to a SIM corresponding to the information included in the received request (e.g., the second SIM 142). When both SIMs are identical or similar, the first terminal device 213 may determine that a request for wireless communication is received from another SIM (e.g., the second SIM 142) of the wireless communication device 100 including the SIM (e.g., the first SIM 141) already communicating with the first terminal device 213. In other words, the first terminal device 213 may determine that the first SIM 141 and the second SIM 142 correspond to the same user or similar users.

When it is determined that the first SIM 141 and the second SIM 142 do not correspond to the same user or similar users (operation S525—N), the first SIM 141 and the second SIM 142 may be included in different wireless communication devices, and thus it may be determined that a request for wireless communication is received from another user using the second SIM 142 while a wireless communication is being performed with a user using the first SIM 141. Therefore, the first terminal device 213 may receive a selection of the user of the first terminal device 213 of whether to accept the request for wireless communication from the second SIM 142 (operation S530). When the user of the first terminal device 213 accepts connection of the wireless communication connection from the second SIM 142 (operation S530—Y), first wireless communication with the first SIM 141 may be ended (operation S535), and a new wireless communication may be performed with the second SIM 142 (operation S540). On the other hand, when the user of the first terminal device 213 does not accept connection of the wireless communication from the second SIM 142 (operation S530—N), a refuse signal may be transmitted to the second SIM (operation S545) and the first wireless communication with the first SIM 141 may be continuously performed (e.g., maintained).

On the other hand, when it is determined that the first SIM 141 and the second SIM 142 correspond to the same user or similar users (operation S525—Y), the first terminal device 213 may check whether an automatic communication transfer function is set (operation S550). Here, the automatic communication transfer function may refer to a function for, when a terminal device supporting Enriched Calling functions receives a request for communication (e.g., Enriched calling request) from another SIM while the terminal device is performing a communication with a particular SIM, determining whether the SIM currently communicating with (e.g., the second SIM 142) and the other SIM (e.g., the first SIM 141) correspond to the same user, or similar users, by using previous call information about a user (or a sender) included in a received Enriched Calling request and, when it is determined that both SIMs correspond to the same user or similar users, automatically accepting the request for communication from the other SIM. Moreover, the name of the automatic communication transfer function is merely an example and may be referred to as various names.

When the automatic communication transfer function is set to the first terminal device 213 (operation S550—Y), the first terminal device 213 may perform connection of a new wireless communication with the second SIM 142 (operation S560) and end the existing first wireless communication 11 with the first SIM 141 to prevent or reduce duplication of communication (operation S565).

On the other hand, when the automatic communication transfer function is not set to the first terminal device 213 (operation S550—N), the first terminal device 213 may receive a selection by the user of the first terminal device 213 of whether to accept a request for connection of wireless communication from the second SIM 142 (operation S555). At this time, the first terminal device 213 may display information about the second SIM 142 through a display and receive a selection of whether to accept the request for connection of wireless communication from the second SIM 142. Detailed descriptions of the operation in which the first terminal device 213 receives a selection of whether to accept a request for connection of wireless communication from the second SIM 142 will be given later with reference to FIG. 11.

When an accept signal for the request for connection of wireless communication from the second SIM 142 is received from the user (operation S555—Y), the first terminal device 213 may perform connection of new wireless communication with the second SIM 142 (operation S560) and end existing first wireless communication 11 with the first SIM 141 to prevent or reduce duplication of communication (operation S565). On the other hand, when no accept signal for the request for connection of wireless communication from the second SIM 142 is received from the user (operation S555—N), the first terminal device 213 may transmit a refuse signal to the second SIM 142, and the wireless communication device 100 may determine that the first terminal device 213 does not accept transfer for a wireless communication to the second SIM 142. Therefore, the wireless communication device 100 may transmit a request for ending the first wireless communication 11 through the first SIM 141 to the first terminal device 213, and the first terminal device 213 may end the first wireless communication 11 with the first SIM 141 (operation S565).

On the other hand, although descriptions are given above with reference to FIG. 8 under the assumption that the first terminal device 213 is a device supporting Enriched Calling functions, the first terminal device 213 may be a device that does not support Enriched Calling functions. In this case, the first terminal device 213 may be unable to determine whether the first SIM 141 and the second SIM 142 are both included in the wireless communication device 100, even when additional information about the first SIM 141 is received together with a request for new wireless communication from the second SIM 142.

Therefore, the first terminal device 213 may receive a selection of the user of whether to accept a request for wireless communication from the second SIM 142. When the user of the first terminal device 213 accepts, an existing wireless communication with the first SIM 141 may be ended and a new wireless communication may be performed with the second SIM 142. On the other hand, when the user of the first terminal device 213 refuses, a wireless communication with the second SIM 142 may be refused. In an embodiment, when the first SIM 141 and the second SIM 142 are included in different wireless communication devices and the user of the first terminal device 213 refuses a request of a wireless communication from the second SIM 142, the first terminal device 213 may maintain a wireless communication with the first SIM 141. In an embodiment, when the first SIM 141 and the second SIM 142 are included in the wireless communication device 100 according to an embodiment of the inventive concepts and the user of the first terminal device 213 refuses a request for wireless communication from the second SIM 142, a wireless communication with the second SIM 142 is not performed, and thus a wireless communication with the first SIM 141 may also be ended.

Figure 9:
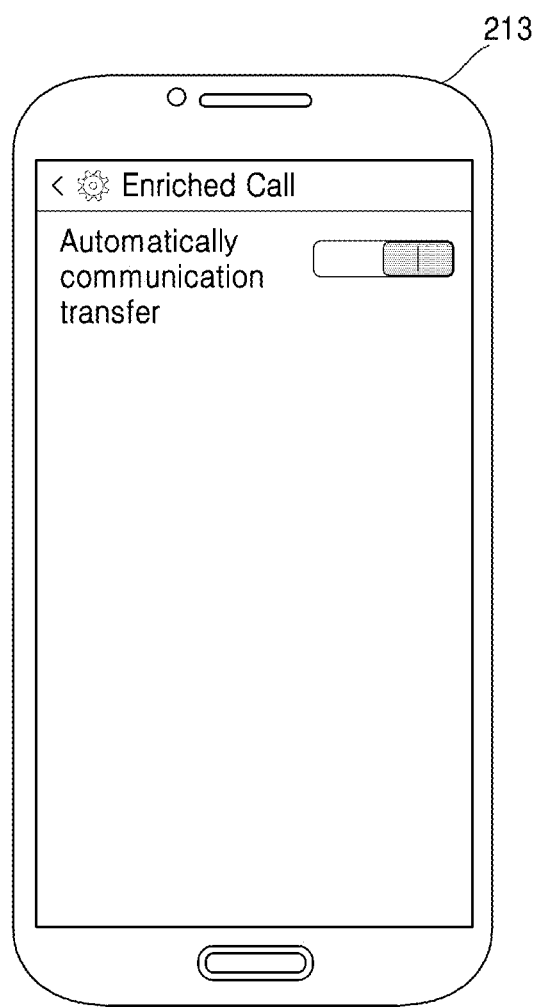
FIG. 9 is a diagram for describing a method of receiving a selection of an automatic transfer setting of a wireless communication connection of a terminal device according to an embodiment of the inventive concepts.

FIG. 9 is a diagram for describing a method of receiving a selection of an automatic transfer setting of a wireless communication connection of a terminal device according to an embodiment of the inventive concepts. In detail, FIG. 9 is a diagram for describing an example of an operation for receiving a selection of a setting of an automatic communication transfer function from a user of the first terminal device 213 of FIG. 8. Moreover, for convenience of explanation, descriptions will be given below based on the operation of the first terminal device 213 of FIG. 1, but the second terminal device 223 of FIG. 1 may operate in substantially the same manner.

Referring to FIGS. 1, 8, and 9, the first terminal device 213 may execute software called an Enriched Call Manager, and the first terminal device 213 may display settings of Enriched Call functions through a display to the user.

In detail, the first terminal device 213 may display a setting of an automatic communication transfer function as an Enriched Call function. The user may select whether to turn the automatic communication transfer function on or off through an input device of the first terminal device 213 or a display supporting touch inputs. The selection of the user may be stored in a memory of the first terminal device 213.

Figure 10:
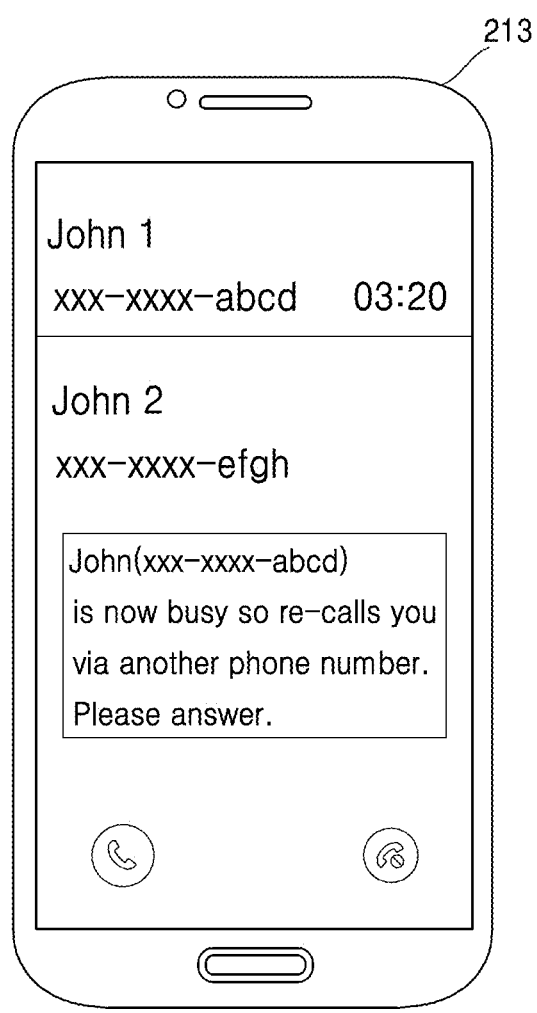
FIG. 10 is a diagram for describing a method of receiving a selection of whether to transfer a wireless communication connection of a terminal device according to an embodiment of the inventive concepts.

FIG. 10 is a diagram for describing a method by which a terminal device receives a selection of whether to transfer connection of wireless communication according to an embodiment of the inventive concepts.

FIG. 10 is a diagram for describing a method of receiving a selection of whether to transfer a wireless communication connection of a terminal device according to an embodiment of the inventive concepts.

Referring to FIGS. 1, 8 and 10, while the wireless communication device 100 is performing first wireless communication with the first terminal device 213 through the first SIM 141, the wireless communication device 100 may establish second wireless communication through the second SIM 142 according to a request of the second terminal device 223. Next, when the wireless communication device 100 determines the second SIM 142 as a target SIM, the wireless communication device 100 may transmit a request for connection of new wireless communication to the first terminal device 213 through the second SIM 142. Hereinafter, the operation of the first terminal device 213 under the above-described circumstances will be described.

Referring to FIG. 10, the first terminal device 213 may receive a request for new second wireless communication (e.g., a second call) from the second SIM 142 corresponding to John 2 while first wireless communication (e.g., a first call) is being performed through the first SIM 141 corresponding to John 1. At this time, the request for the second wireless communication may include at least one of a Call Composer ID and/or a Call ID of a previous call, or a current call, of the first SIM 141 as information about the first SIM 141 in items of Enriched Call information about the second SIM 142, that is, items including Important Call Indicator, Subject, Image, and/or Location. Also, Enriched Call information about second wireless communication call may include a message set in advance to request the user of the first terminal device 213 to accept the second wireless communication.

Then, the first terminal device 213 may display the message requesting acceptance of the second call, and receive a selection from the user of the first terminal device 213 of whether to accept the request for the second wireless communication from the second SIM 142. The user may select to accept or refuse the request for the second wireless communication from the second SIM 142 through an input device of the first terminal device 213 or a display supporting touch inputs.

When the user selects to accept, the first terminal device 213 may perform a wireless communication with the second SIM 142 and end wireless communication with the first SIM 141. On the other hand, when the user selects to refuse, the first terminal device 213 may transmit a refuse signal to the second SIM 142 and, according to a request of the first SIM 141, end the wireless communication with the first SIM 141.

Moreover, the example of FIG. 10 is an embodiment in which the first terminal device 213 is set to turn off the automatic communication transfer function. When the first terminal device 213 is set to turn on the automatic communication transfer function and a request for connection of new second wireless communication is received from the second SIM 142 corresponding to John 2 while first wireless communication is being performed through the first SIM 141 corresponding to John 1, the first terminal device 213 may perform the automatic communication transfer function. In other words, the first terminal device 213 may determine whether the first SIM 141 and the second SIM 142 correspond to the same user, or similar users, without receiving a selection of the user of whether to accept a wireless communication with the second SIM 142, and, when it is determined that both SIMs correspond to the same user or similar users, the first terminal device 213 may automatically perform the wireless communication with the second SIM 142.

Figure 11:
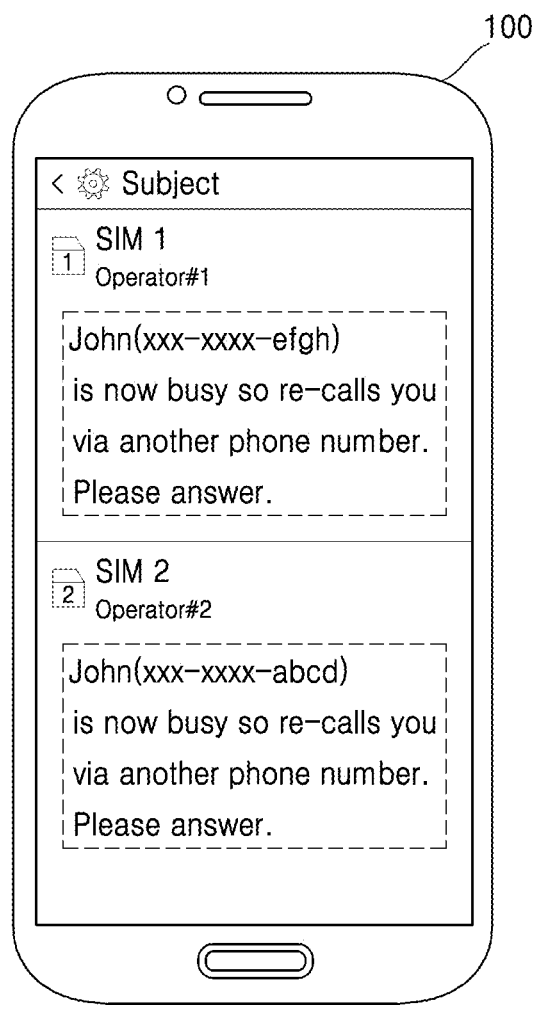
FIG. 11 is a diagram for describing a method of setting a message for requesting transfer of wireless communication connection of a wireless communication device according to an embodiment of the inventive concepts.

FIG. 11 is a diagram for describing a method of setting a message for requesting transfer of wireless communication connection of a wireless communication device according to an embodiment of the inventive concepts. In detail, FIG. 11 is a diagram for describing a method by which the wireless communication device 100 of FIG. 1 receives an input of the content of a message used when each SIM is determined as a target SIM from a user.

Referring to FIGS. 1, 10, and 11, the wireless communication device 100 may execute software called an Enriched Call Manager, and the wireless communication device 100 may display settings of Enriched Call functions through a display to the user.

In detail, the wireless communication device 100 may display a setting related to information about each SIM as an Enriched Call function. For example, referring to FIG. 11, as information about each SIM, the wireless communication device 100 may display a setting of a message used when each SIM is determined as a target SIM. As shown in FIG. 10, the message may include content for requesting accept of a wireless communication when a target SIM requests a new wireless communication to a terminal device.

A user may input and edit the message for each SIM through an input device of the first terminal device 213 or a display supporting touch inputs. A setting set by the user may be stored in a memory of the wireless communication device 100.

Figure 12:
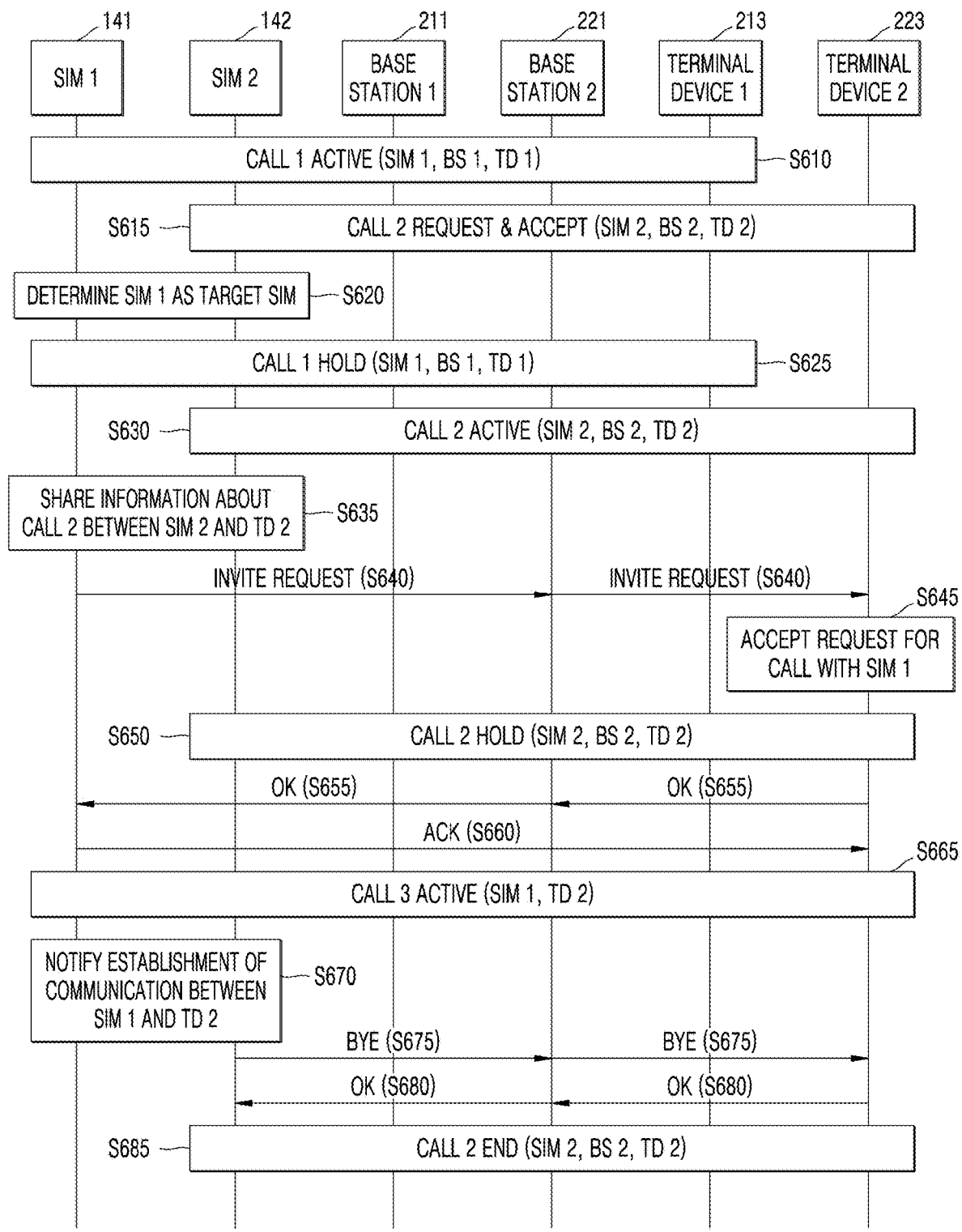
FIG. 12 is a flowchart showing an example of operations of a wireless communication device, a plurality of base stations, and a plurality of terminal devices according to an embodiment of the inventive concepts.

FIG. 12 is a flowchart showing an example of operations of a wireless communication device, a plurality of base stations, and/or a plurality of terminal devices according to an embodiment of the inventive concepts. In detail, FIG. 12 is a flowchart showing an example of operations of the wireless communication device 100, the first base station 211, the second base station 221, the first terminal device 213, and the second terminal device 223 of FIG. 1. Hereinafter, an embodiment in which the first SIM 141 is determined as a target SIM will be described.

Referring to FIGS. 1 and 12, the wireless communication device 100 may perform a first call between the first SIM 141 and the first terminal device 213 through the first base station 211 (operation S610). The wireless communication device 100 may receive a request for a second call with respect to the second SIM 142 from the second terminal device 223 through the second base station 221 while the first call is being performed, and accept the request for the second call (operation S615).

Next, the wireless communication device 100 may determine the first SIM 141 as the target SIM (operation S620). And, as the request for the second call is accepted, the first call between the first SIM 141 and the first terminal device 213 may be changed to the hold state (operation S625), and the second call between the second SIM 142 and the second terminal device 223 may be in the active state (operation S630).

Next, the first SIM 141 and the second SIM 142 may share information about the second call (operation S635). For example, the first SIM 141 and the second SIM 142 may share information about the second terminal device 223 and/or information about the second SIM 142.

Next, the first SIM 141 may transmit a request for a third call to the second terminal device 223 through the second base station 221 based on shared information (operation S640). The request of the third call may include at least one of a Call Composer ID and/or a Call ID of the second SIM 142 in items of Enriched Call Information about the first SIM 141, the items including Important Call Indicator, Subject, Image, and/or Location. Moreover, the first SIM 141 may transmit a request for a third call to the second terminal device 223 through the first base station 211 rather than the second base station 221.

Next, the second terminal device 223 may accept the request for the third call (operation S645). In detail, the second terminal device 223 may determine whether the first SIM 141 and the second SIM 142 correspond to the same user, or similar users, based on received information about the second SIM 142, and, when it is determined that both SIMs correspond to the same user or similar users, the second terminal device 223 may accept the request for the third call. Alternatively, the second terminal device 223 may receive a selection of the user of the second terminal device 223 of whether to accept the request for the third call.

Next, as the request for the third call is accepted, the second call between the second SIM 142 and the second terminal device 223 may be changed to the hold state (operation S650), and the second terminal device 223 and the first SIM 141 may transmit and receive signals to and from each other for establishing the third call (operation S655 and operation S660). Next, a new third call between the first SIM 141 and the second terminal device 223 may be in the active state (operation S665).

Next, the first SIM 141 may notify the second SIM 142 that the establishment of the third call between the first SIM 141 and the second terminal device 223 is completed (operation S670). Next, as the third call is established, the second SIM 142 and the second terminal device 223 may transmit and receive signals for ending the second call to and from each other (operation S675 and operation S680). Next, an existing second call between the second SIM 142 and the second terminal device 223 may be ended (operation S685).

Figure 13:
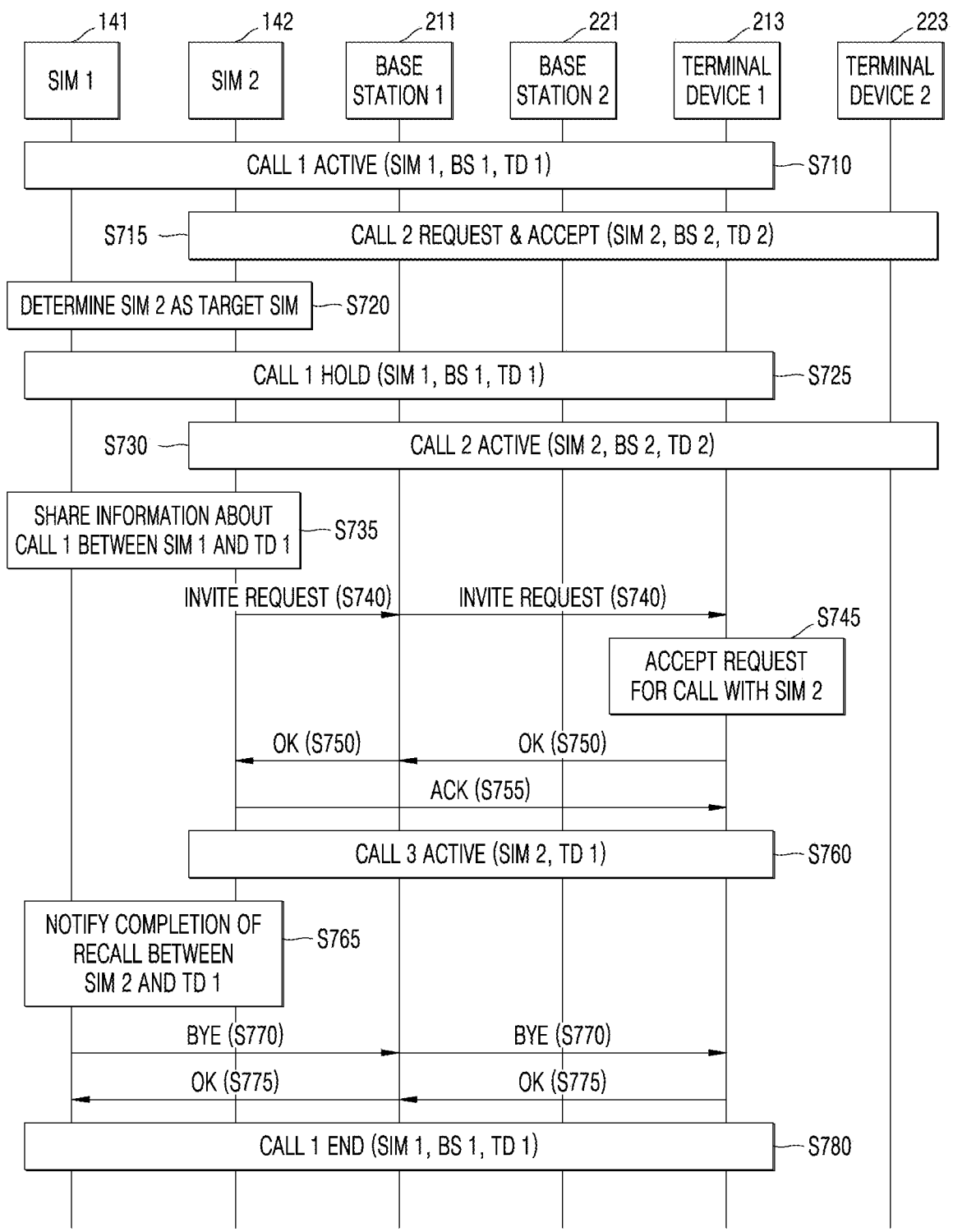
FIG. 13 is a flowchart showing an example of operations of a wireless communication device, a plurality of base stations, and a plurality of terminal devices according to an embodiment of the inventive concepts.

FIG. 13 is a flowchart showing an example of operations of a wireless communication device, a plurality of base stations, and/or a plurality of terminal devices according to an embodiment of the inventive concepts. In detail, FIG. 13 is a flowchart showing an example of operations of the wireless communication device 100, the first base station 211, the second base station 221, the first terminal device 213, and the second terminal device 223 of FIG. 1. Hereinafter, an embodiment in which the second SIM 142 is determined as a target SIM will be described.

Referring to FIGS. 1 and 13, the wireless communication device 100 may perform a first call between the first SIM 141 and the first terminal device 213 through the first base station 211 (operation S710). The wireless communication device 100 may receive a request for a second call with respect to the second SIM 142 from the second terminal device 223 through the second base station 221 while the first call is being performed, and accept the request for the second call (operation S715).

Next, the wireless communication device 100 may determine the second SIM 142 as the target SIM (operation S720). And, as the request for the second call is accepted, the first call between the first SIM 141 and the first terminal device 213 may be changed to the hold state (operation S725), and the second call between the second SIM 142 and the second terminal device 223 may be in the active state (operation S730).

Next, the first SIM 141 and the second SIM 142 may share information about the first call (operation S735). For example, the first SIM 141 and the second SIM 142 may share information about the first terminal device 213 and/or information about the first SIM 141.

Next, the second SIM 142 may transmit a request for a third call to the first terminal device 213 through the first base station 211 based on shared information (operation S740). At this time, the request of the third call may include at least one of a Call Composer ID and/or a Call ID of the first SIM 141 in items of Enriched Call Information about the second SIM 142, the items including Important Call Indicator, Subject, Image, and/or Location. Moreover, the second SIM 142 may transmit a request for a third call to the first terminal device 213 through the second base station 221 rather than the first base station 211.

Next, the first terminal device 213 may accept the request for the third call (operation S745). In detail, the first terminal device 213 may determine whether the first SIM 141 and the second SIM 142 correspond to the same user, or similar users, based on received information about the first SIM 141, and, when it is determined that both SIMs correspond to the same user or similar users, the first terminal device 213 may accept the request for the third call. Alternatively, the first terminal device 213 may receive a selection of the user of the first terminal device 213 of whether to accept the request for the third call.

Next, as the third call is established, the first terminal device 213 and the second SIM 142 may transmit and receive signals for establishing the third call to and from each other (operation S750 and operation S755). Next, a new third call between the second SIM 142 and the first terminal device 213 may be in the active state (operation S760).

Next, the second SIM 142 may notify the first SIM 141 that the establishment of the third call between the second SIM 142 and the first terminal device 213 is completed (operation S765). Next, as the third call is established, the first SIM 141 and the first terminal device 213 may transmit and receive signals for ending the first call to and from each other (operation S770 and operation S775). Next, an existing first call between the first SIM 141 and the first terminal device 213 may be ended (operation S780).

Moreover, in the illustrations and descriptions of FIGS. 12 and 13, the first base station 211 and the second base station 221 are illustrated and described as base stations separate from each other, but the inventive concepts are not limited thereto, and the first base station 211 and the second base station 221 may be the same base station or similar base stations.

Figure 14:
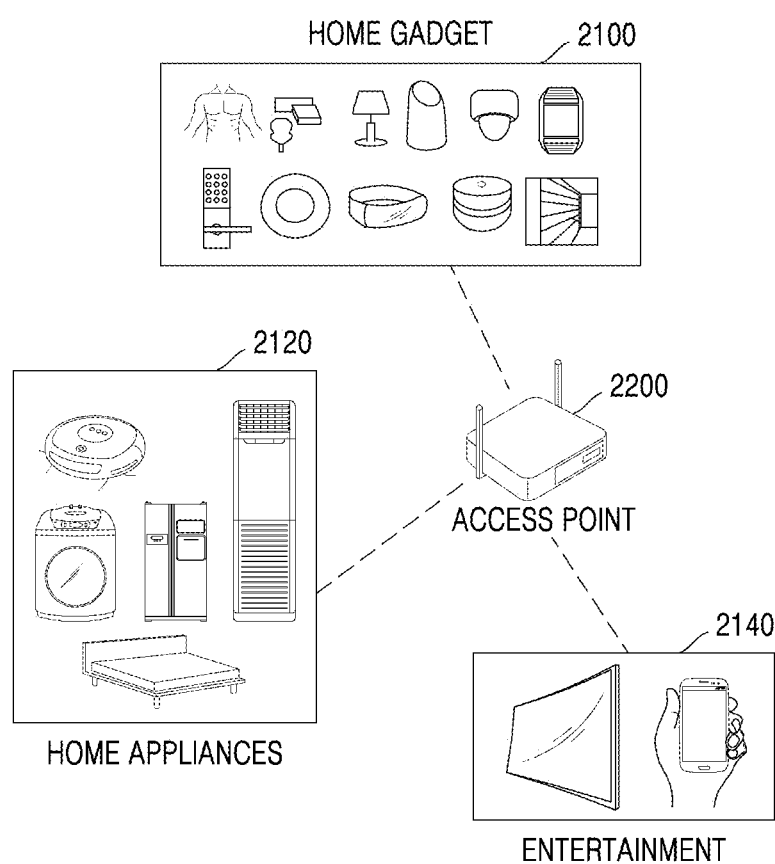
FIG. 14 is a diagram showing communication devices performing a wireless communication connection according to an embodiment of the inventive concepts.

FIG. 14 is a diagram showing communication devices performing a wireless communication connection according to an embodiment of the inventive concepts.

Referring to FIG. 14, a home device (e.g., home gadget) 2100, a household appliance (e.g., home appliance) 2120, an entertainment device 2140, and/or an access point (AP) 2200 may perform a wireless communication method according to an embodiment of the inventive concepts. In some an embodiment, the home device 2100, the household appliance 2120, the entertainment device 2140, and/or the AP 2200 may constitute an IP multimedia service calls through an Internet of Things (IoT) network system. It will be understood that the communication devices shown in FIG. 14 are merely examples, and other communication devices not shown in FIG. 14 may include a wireless communication device according to an embodiment of the inventive concepts.

Conventional multi-SIM devices in which the SIMs share RF resources of the device are unable to connect to a new wireless communication on a first SIM while maintaining a previous wireless communication on a second SIM. In particular, the conventional multi-SIM devices are unable to perform and/or maintain a wireless communication of a non-active SIM (a SIM that does not have access to the RF resources of the device). Accordingly, when a request for the new wireless communication is received through the first SIM while the second SIM is performing the previous wireless communication, conventional multi-SIM devices either end the previous wireless communication or reject the new wireless communication. Thus, the conventional multi-SIM devices fail to provide the functionality of performing and/or maintaining two wireless communications of different SIMs.

However, according to an embodiment, improved multi-SIM devices and methods are provided in which a wireless communication performed on a non-target SIM is transferred to a target SIM such that two wireless communications of different SIMs are contemporaneously performed through the target SIM. Accordingly, the improved multi-SIM devices and methods overcome the deficiencies of the conventional multi-SIM devices to enable the functionality of performing and/or maintaining two wireless communications of different SIMs.

According to an embodiment, operations described herein as being performed by the wireless communication system 10, the first base station 211, the second base station 221, the first terminal device 213, the second terminal device 223, the wireless communication device 100, the RFIC 120, the multi-SIM device 130, the protocol stack system 20, the first protocol stake 21, the second protocol stack 22, the resource manager 23 and/or the hardware interface 24 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as processing circuitry. For example, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with an embodiment disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concepts have been particularly shown and described with reference to an embodiment thereof, it will be understood that various changes in form and details may be made therein without departing from the spirit and scope of the following claims.

What is claimed is:

1. A method of performing wireless communication for a wireless communication device comprising a first Subscriber Identity Module (SIM) and a second SIM, the method comprising:
    performing a first wireless communication with a first terminal device through the first SIM;
    receiving a request for connection of a second wireless communication from a second terminal device through the second SIM;
    transmitting, via the first SIM, a request for connection of a third wireless communication to the second terminal device, or transmitting, via the second SIM, the request for connection of the third wireless communication to the first terminal device; and
    performing the third wireless communication with the second terminal device through the first SIM based on an accept signal received from the second terminal device while performing the first wireless communication through the first SIM, or performing the third wireless communication with the first terminal device through the second SIM based on an accept signal received from the first terminal device while performing the second wireless communication through the second SIM.

2. The method of claim 1, wherein the performing the third wireless communication further comprises:
    placing the first wireless communication on hold; and
    performing the second wireless communication.

3. The method of claim 1, wherein the performing the third wireless communication further comprises:
    ending the third wireless communication with the second terminal device based on a refuse signal received from the second terminal device or ending the third wireless communication with the first terminal device based on a refuse signal received from the first terminal device.

4. The method of claim 1, wherein the transmitting the request for connection comprises:
    obtaining information indicative of whether the first SIM and the second SIM are both included in the wireless communication device,
    wherein the request for connection of the third wireless communication includes the information indicative of whether the first SIM and the second SIM are both included in the wireless communication device.

5. The method of claim 4, wherein the information indicative of whether the first SIM and the second SIM are both included in the wireless communication device comprises at least one of an Important Call Indicator, a Subject, an Image, a Location, a Call Composer ID, or a Session Initiation Protocol (SIP) Call ID.

6. The method of claim 1, further comprising:
    determining a SIM set to be used for a plurality of wireless communications among the first SIM and the second SIM as a target SIM.

7. The method of claim 1, further comprising:
    determining one of the first SIM or the second SIM as a target SIM performing third wireless communication in response to receiving a selection of the one of the first SIM or the second SIM.

8. The method of claim 7, further comprising:
    ending the first wireless communication in response to receiving a selection not indicating one of the first SIM or the second SIM.

9. A wireless communication device comprising:
    a first Subscriber Identity Module (SIM);
    a second SIM; and
    processing circuitry configured to
    receive a request for a second call from a second terminal device through the second SIM while a first call is being performed with a first terminal device through the first SIM,
    accept the second call in response to the request for a second call from the second terminal device,
    control the second SIM to switch the second call to a call active state,
    control the first SIM to switch the first call to a call hold state, and control the first SIM to obtain information about the second terminal device from the second SIM and transmit a request for a third call to the second terminal device based on the information about the second terminal device, or control the second SIM to obtain the information about the first terminal device and transmit the request for the third call to the first terminal device.

10. The wireless communication device of claim 9, wherein the request for the third call includes at least one of an Important Call Indicator, a Subject, Image, a Location, a Call Composer ID, and/or a Session Initiation Protocol (SIP) Call ID.

11. The wireless communication device of claim 9, wherein the processing circuitry is configured to cause the wireless communication device to:
control the second SIM to end the second call in response to receiving an accept signal from the second terminal device and
control the first SIM to perform the third call with the second terminal device, or control the first SIM to end the first call in response to receiving an accept signal from the first terminal device and control the second SIM to perform the third call with the first terminal device.

12. The wireless communication device of claim 11, wherein the processing circuitry is configured to cause the wireless communication device to:
switch the third call to a call active state; and
control the first SIM to maintain the call hold state of the first call, or control the second SIM to maintain the call hold state of the second call.

13. The wireless communication device of claim 9, wherein the processing circuitry is configured to cause the wireless communication device to:
control the second SIM to end the second call in response to receiving a refuse signal from the second terminal device; and
control the first SIM to switch the first call to a call active state, or
control the first SIM to end the first call in response to receiving a refuse signal from the first terminal device and control the second SIM to switch the second call to the call active state.

14. The method of claim 8, wherein
the performing the third wireless communication with the second terminal device through the first SIM is performed in response to receiving a selection of the first SIM via a user interface;
the performing the third wireless communication with the first terminal device through the second SIM is performed in response to receiving a selection of the second SIM via the user interface;
a plurality of options provided by the user interface includes ending the first wireless communication; and
the ending the first wireless communication is performed in response to receiving a selection for ending the first wireless communication among the plurality of options.

* * * * *